Dec. 29, 1942. R. J. MARTIN 2,306,994
BUMPER FOR AUTOMOBILES
Filed Sept. 6, 1941 2 Sheets-Sheet 1
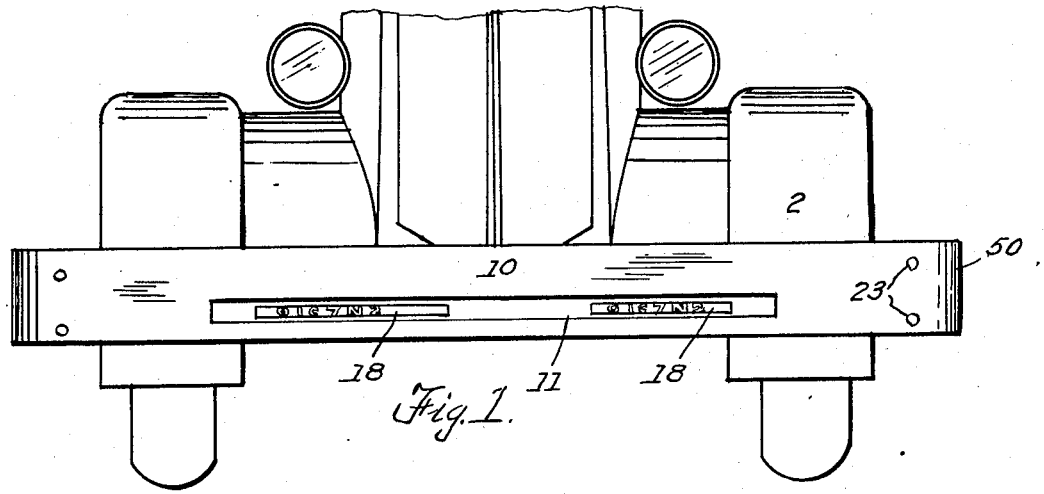
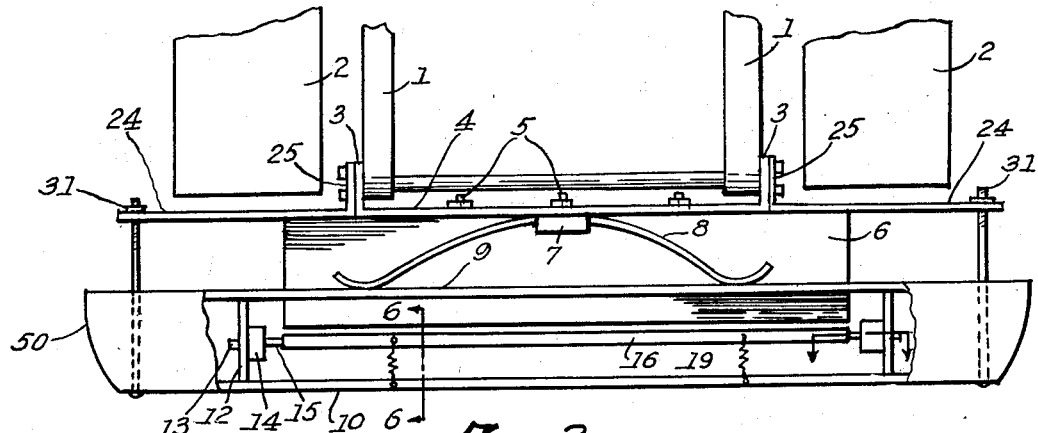
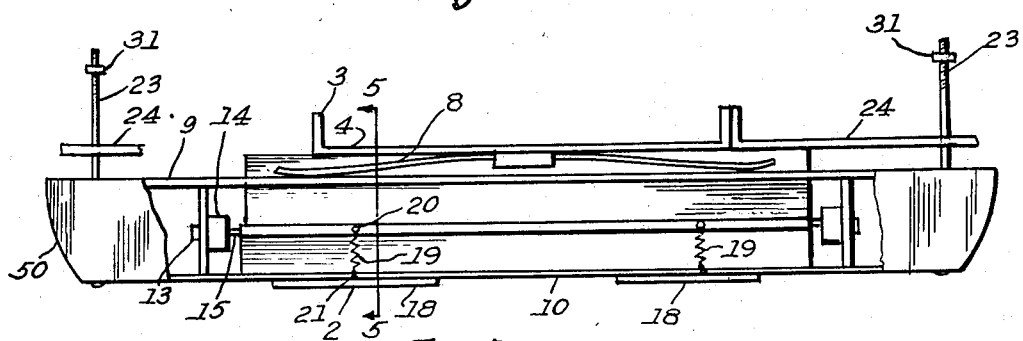
Inventor
ROBERT J. MARTIN
By C. James Cottrell
Attorney Dec. 29, 1942.　　　R. J. MARTIN　　　2,306,994
BUMPER FOR AUTOMOBILES
Filed Sept. 6, 1941　　　2 Sheets-Sheet 2
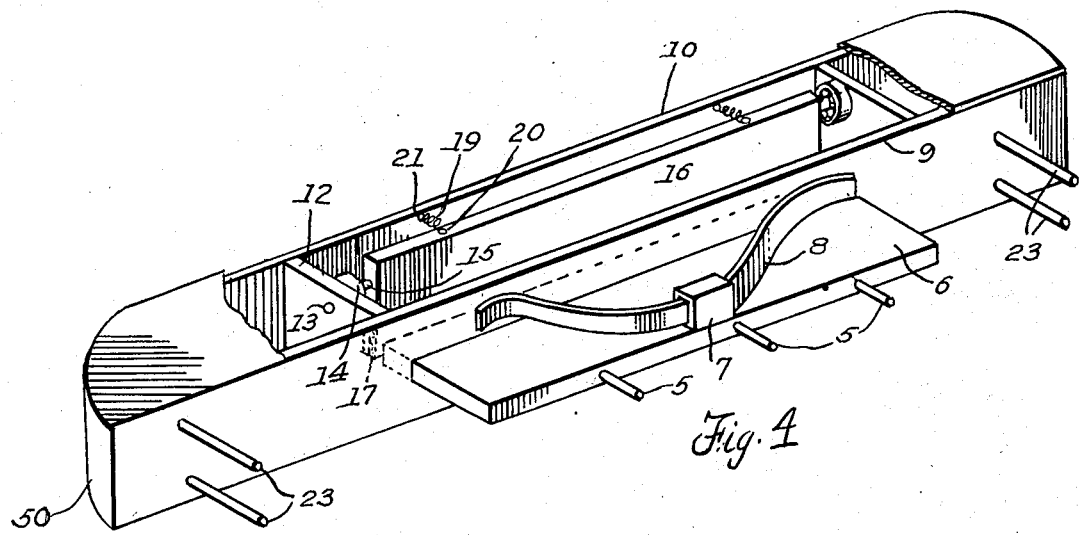
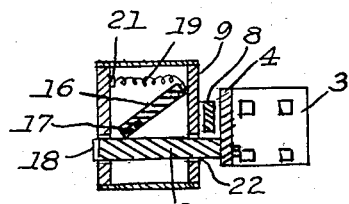
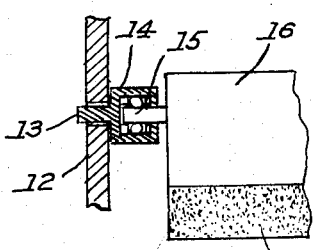
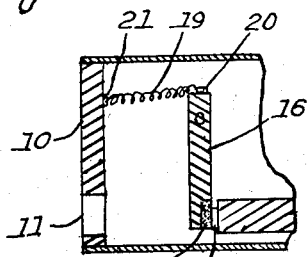
Inventor
ROBERT J. MARTIN
By C. James Cottrell
Attorney Patented Dec. 29, 1942

2,306,994

UNITED STATES PATENT OFFICE 2,306,994

BUMPER FOR AUTOMOBILES

Robert J. Martin, Austin, Tex., assignor of one-third to Yates Wilson, Guadalupe County, Tex.

Application September 6, 1941, Serial No. 409,878

6 Claims. (Cl. 293—55)

This application is a continuation in part of my application, Ser. No. 327,515, filed April 2, 1940.

This invention relates to improvements for bumpers for automobiles; and more particularly to the provision of a device to automatically make an identifying mark when an automobile carrying the device collides with another object.

With the increase in the number of automobiles, the number of "hit and run" drivers has increased proportionately. While many "hit and run" drivers are appended, the majority escape as they generally leave no identifying mark.

It is, therefore, an object of this invention to provide a bumper for an automobile having associated therewith means for automatically making an identification mark when the bumper strikes an object. Should it be required by law that all automobiles be provided with such a device, it is obvious that a larger number of "hit and run" drivers would be apprehended.

A further object is the provision of a device which can be mounted on either the front or the rear of an automobile to identify the automobile automatically during a collision.

These and other objects are attained by the novel arrangement, construction and combination of parts hereinafter set forth in the following specification, and illustrated in the accompanying drawings, forming a part thereof, in which:

Fig. 1 is a front elevational view of the device attached to an automobile.

Fig. 2 is a plan view of the device, with a part of the cover broken away.

Fig. 3 is a plan view of the device showing the position of parts during a collision.

Fig. 4 is a perspective view of the device, looking from the rear.

Fig. 5 is a sectional view taken on the line 5—5 of Fig. 3.

Fig. 6 is a sectional view taken on the line 6—6 of Fig. 2.

Fig. 7 is a sectional view taken on the line 7—7 of Fig. 2.

Referring to the drawings, the device is shown in Fig. 1 and Fig. 2, attached to the frame members 1 of an automobile having fenders 2, by means of angles 3 integral with and at right angles to a plate 4, to which is attached by means of bolts 5, a platen 6.

Fixed to the platen 6 is a block 7 which supports a bowed spring 8, the ends of which bear against the rear wall 9 of a casing 50, which has a front wall 10, provided with a longitudinal slot 11 for the passage of the platen 6.

The casing 50 is provided with a pair of spaced partitions 12 at right angles to the walls 9 and 10. Each partition rotatably supports a stub shaft 13 integral with a casing 14 containing ball bearings which support a short shaft 15 fixed to a normally vertical plate 16, the lower edge thereof being provided with an inked pad 17, normally urged against identifying characters 18, by tension springs 19 fixed at 20 to the platen 16, and at 21 to the front wall 10. The characters 18 are fixed to the front edge of the platen 6, which also passes through a slot 22 in the rear wall 9. (See Figs. 5 and 6.)

Fixed to each end of the casing 50 are a pair of guide rods 23, which pass through apertures in plates 24, which are provided with angles 25 attached to the frame 1. Outward movement of the casing is limited by the nuts 31 threaded on the guide rods.

In operation, normally the parts are positioned as shown in Fig. 2 with the casing urged forwardly by the spring 8, and the inking pad 17 urged against the characters 18 by the tension springs 19. When the bumper strikes an object, the casing 50 is forced rearwardly against the action of the bowed spring 8, the casing 50 being guided by the rods 23. As the casing 50 moves to the rear, the platen 6 moves through the slots 11 and 22, moving the plate 16 about its pivots 15 to a position as shown in Fig. 5, and the characters 18, properly inked, are brought into contact with the object struck and leave an identifying mark thereon.

Two or more sets of characters 18 may be provided on each bumper so that impressions can be made at several points of contact, and similar bumpers may be mounted on the front and rear of the automobile.

From the above description it will be seen that I have provided a simple and effective device for automatically identifying an automobile during collision with an object. The identification mark of every automobile or similar vehicle being registered, it would readily enable the apprehension of "hit-and-run" drivers.

The foregoing disclosure is to be regarded as descriptive and illustrative only, and not as restrictive or limitative of the invention, of which embodiments may be constructed without departing from the general scope herein indicated and denoted in the appended claims.

Having thus described the invention, what is claimed as new and desired to be secured by Letters Patent is:

1. In combination with a motor vehicle, a bumper mounted on the motor vehicle and comprising a casing having slots in parallel walls thereof, a platen slidable through said slots, said platen being fixed to the frame of the motor vehicle, spring means carried by the platen and bearing against the casing to normally urge the casing outwardly from the vehicle, plates attached to the vehicle and having apertures therein, guide rods fixed to the casing and slidable through the apertures in said plates, a plate pivotally mounted in the casing and having the lower end thereof provided with an inking pad, identifying characters fixed to the forward end of the platen, and spring means normally urging the inking pad into engagement with the identifying characters.

2. In combination with a motor vehicle, a bumper mounted on the vehicle, said bumper comprising a casing having parallel front and rear walls, said walls having longitudinal slots therein, a platen slidable through said slots, said platen being fixed to the frame of the motor vehicle, spring means carried by the platen and bearing against the rear wall of the casing to urge the casing outwardly from the vehicle, guide rods for the casing, means to limit the outward movement of the casing, an inking pad movably mounted in the casing, identifying characters fixed to the forward edge of the platen, and spring means normally urging the inking pad into engagement with said characters.

3. In combination with a motor vehicle, a device for automatically identifying the vehicle during a collision, said device comprising a casing having parallel front and rear walls, said walls having longitudinal slots therein, a platen fixed to the vehicle and adapted to slide through said slots, identifying characters fixed to the forward edge of the platen, spring means fixed to the platen and bearing against the casing to urge the casing outwardly from the vehicle, means to guide and limit the outward movement of the casing, an inking pad movably mounted in the casing, and means normally urging the inking pad into engagement with said characters.

4. In combination with a motor vehicle, a device for automatically identifying the vehicle during a collision, said device comprising a casing, guide rods fixed to the casing, means on the vehicle slidably supporting said guide rods, means to limit the sliding movement of the casing, a platen fixed to the vehicle and having identifying characters fixed to the forward edge thereof, said casing being slidable adjacent to and relative to the platen during a collision, spring means fixed to the platen and bearing against the casing to normally urge the casing outwardly from the vehicle, an inking pad movably supported by the casing, and means to normally urge the inking pad into engagement with said characters.

5. In combination with a motor vehicle, a device for automatically identifying the vehicle during a collision, said device comprising a bumper, guide rods fixed to the bumper, means on the vehicle slidably supporting the guide rods, means to limit the sliding movements of the bumper, a platen fixed to the vehicle and carrying means to normally bear against the bumper and urge the bumper outwardly from the vehicle, identifying characters fixed to the platen and adapted to make identifying marks on an object struck by the bumper, said bumper being slidable over and adjacent to the platen, inking means movably supported by the bumper, and means normally urging the inking means into engagement with the characters.

6. In combination with a motor vehicle, a device for automatically identifying the vehicle during a collision, said device comprising a bumper, guide rods fixed to the bumper, means on the vehicle slidably supporting the guide rods, means to limit the sliding movements of the bumper, a platen fixed to the vehicle and carrying means to normally bear against the bumper and urge the bumper outwardly from the vehicle, and identifying characters fixed to the platen and adapted to make identifying marks on an object struck by the bumper, said bumper being slidable over and adjacent to the platen.

ROBERT J. MARTIN.